United States Patent [19]

Harada et al.

[11] Patent Number: 4,491,412
[45] Date of Patent: Jan. 1, 1985

[54] METHOD FOR CHARACTERIZING SOLDER COMPOSITIONS

[75] Inventors: Shigeo Harada, Isehara; Soitiro Tosima, Machida, both of Japan

[73] Assignee: RCA Corporation, New York, N.Y.

[21] Appl. No.: 409,366

[22] Filed: Aug. 19, 1982

[51] Int. Cl.³ .................... G01N 21/88; B23K 1/00
[52] U.S. Cl. ................. 356/36; 228/104; 356/237; 436/2; 436/164
[58] Field of Search .......... 356/36, 237; 436/2, 436/164; 228/103–105

[56] References Cited

U.S. PATENT DOCUMENTS 4,409,333  10/1983  Tosima et al. .......... 436/164 X

*Primary Examiner*—Vincent P. McGraw
*Attorney, Agent, or Firm*—Birgit E. Morris; Edward J. Sites

[57] ABSTRACT

The present method can determine the presence and amount of silvery white metallic impurities in a silvery white molten solder composition. In accordance with the method of this invention, a transparent substrate which has sequential layers of metal deposited on one of the surfaces thereof is prepared. A first layer is formed directly on the substrate of a thin film of a colored metal such as copper or gold. A second thicker layer of a silvery white metal, the presence and amount of which is desired to be evaluated in the solder composition, deposited over the first layer. In use, the substrate is placed in contact with the molten solder. The amount of time required for the second layer to dissolve into the solder bath and the exposed first colored layer to change color due to alloying with the metal of the solder, is measured. The time required for the color change to occur is correlated to the level of contamination of the silvery white metal in the solder bath.

8 Claims, 7 Drawing Figures

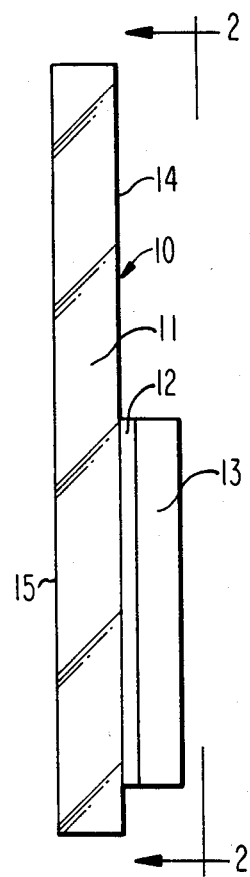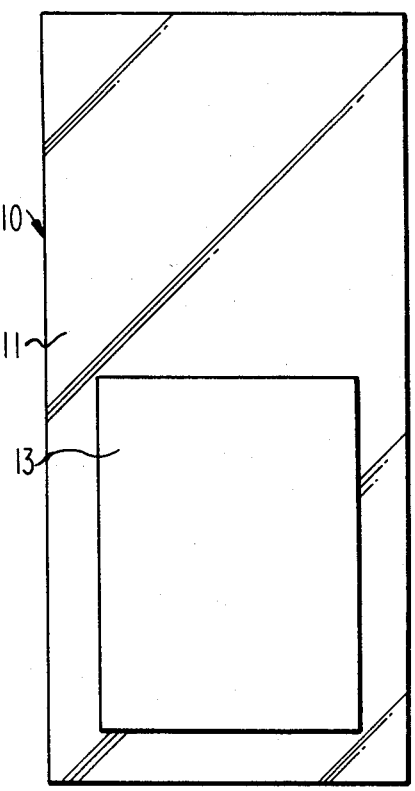
Fig. 1                Fig. 2
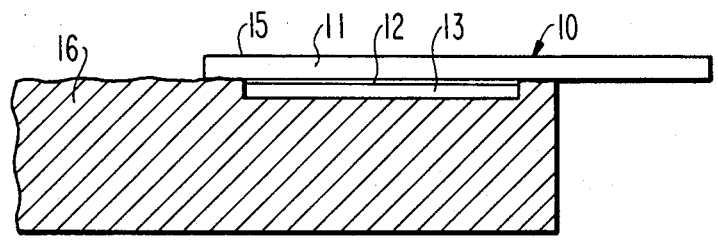
Fig. 3

METHOD FOR CHARACTERIZING SOLDER COMPOSITIONS

This invention relates to a method for characterizing solder compositions and more particularly is concerned with a method for qualitatively and/or quantitatively determining optically the presence of silvery white metal contaminates such as silver, nickel, zinc or bismuth, in a silvery white solder alloy composition.

BACKGROUND OF THE INVENTION

It is highly desirable in order to have consistent high quality soldering that all soldering parameters be held as uniform as possible. In particular, it is desirable that the composition of the solder composition itself remain within specific ratios. However, under the conditions normally encountered in commercial mass soldering processes it is extremely difficult, if not impossible, to prevent metallic impurities from being introduced into the molten solder bath. For example, during the mass wave soldering of electronic circuit boards and the like, the molten solder bath is normally contaminated by impurities leached from the circuit boards which are being soldered.

Certain of these metallic impurities, even when present in relatively small amounts, can dramatically and adversely affect the wetting and alloying properties of solder compositions. Certain of the metallic impurities may promote the formation of inter-metallic compounds which are insoluble in the solder composition, resulting in solder joints having a gritty consistency. Other metallic impurities readily oxidize at the surface of the solder bath, thereby increasing the surface tension of the solder which changes the solder flow characteristics. The presence of impurities is also known to give rise to defects in the finish soldered product by causing undesired bridging between closely spaced components and circuitry and also by increasing the tendency for the formation of solder icicles on the soldered circuit boards.

It is accordingly important to carefully monitor both the type and the amount of impurities in the solder. This is now done by chemical analysis, spectrographic analysis or by various other techniques, all of which are expensive to conduct and often are extremely time-consuming. In a dynamic manufacturing situation where the soldering is continued while tests are being run, the actual solder composition may well vary substantially from the analyzed results by the time the results of the tests are obtained.

In copending patent application of Tosima et al., Ser. No. 327,595, filed Dec. 4, 1981, U.S. Pat. No. 4,409,333, entitled *Method for Evaluating Solderability*, a method is disclosed for the determination of the presence and amount of colored metals, such as copper and gold, present as impurities in silvery white solder baths. The Tosima et al. method utilizes as a test piece a transparent substrate which has a layer of the colored metal on one surface of the substrate. The surface of the substrate having the colored metal layer is immersed in the solder alloy bath. The colored metal layer on the substrate forms a silvery white copper alloy with the solder and the color change is observed through the substrate. The time required for the color change is indirectly related to the relative amount of the colored metal present as an impurity in the solder bath.

The Tosima et al. method is highly accurate, fast and effective for determining the amount of colored metal impurities such as copper or gold in a silvery colored solder composition, but is not effective for determining the presence and the relative amount of silvery white metal impurities such as silver, nickel, zinc, and bismuth in silvery white solder compositions.

What would be highly advantageous would be an optical evaluation method similar to that used for the colored metal contaminates which could be used to determine the presence and amount of silvery white metal impurities in silvery white solder compositions which would be both simple to conduct and would give rapid and accurate results.

SUMMARY OF THE INVENTION

The present method can determine the presence and amount of silvery white metallic impurities in a silvery white molten solder composition. In accordance with the method of this invention, a transparent substrate which has sequential layers of metal deposited on one of the surfaces thereof is prepared. A first layer is formed directly on the substrate of thin film of a colored metal such as copper or gold. A second thicker layer of a silvery white metal, the presence and amount of which is desired to be evaluated in the solder composition, deposited over the first layer. In use, the substrate is placed in contact with the molten solder. The amount of time required for the second layer to dissolve into the solder bath and the exposed first colored layer to change color due to alloying with the metal of the solder, is measured. The time required for the color change to occur is correlated to the level of contamination of the silvery white metal in the solder bath.

BRIEF DESCRIPTION OF THE DRAWING

FIG. 1 is a side view of a test substrate used in the method of this invention.

FIG. 2 is a top plan view of the test substrate of this invention taken as indicated by the lines and arrows 2 on FIG. 1.

FIG. 3 is a schematic illustration showing how the method of the present invention is conducted.

DETAILED DESCRIPTION OF THE INVENTION

Figure 5:
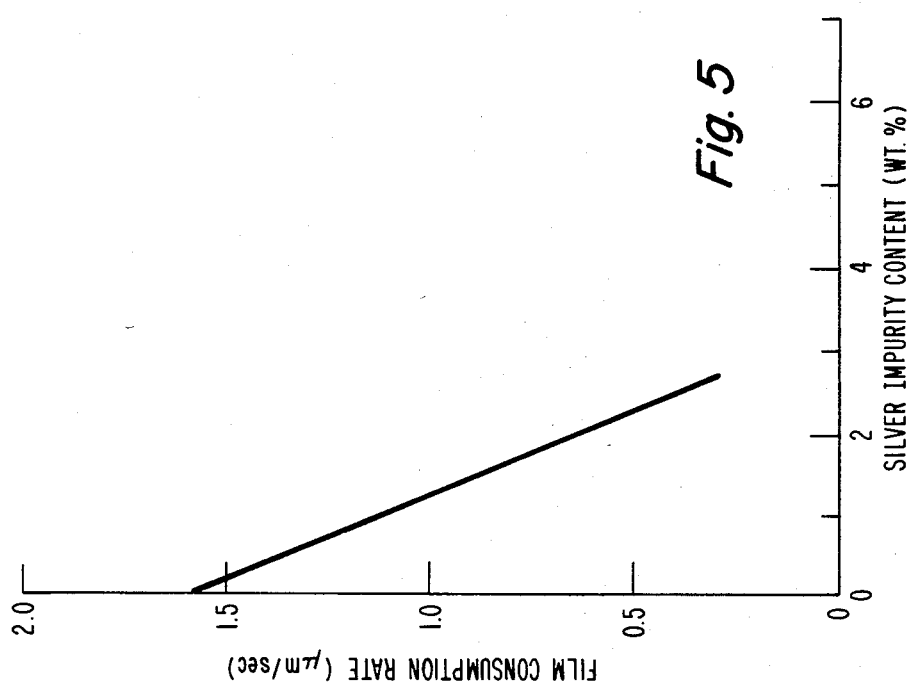
FIG. 5 is a graphic illustration showing the rate of consumption of a silver film as related to the amount of silver as an impurity in a sixty percent tin/forty percent lead solder composition.

In describing the present invention, specific attention will be directed to the characterization of a nominally 60 percent tin/40 percent lead solder composition. This particular solder composition was selected because it is one of the most widely used solder compositions employed in the manufacture of electronic apparatus. It should be appreciated, however, that the same method can likewise be employed to detect the presence of silvery white metallic impurities in other types of silvery white solder compositions.

In order to perform the method of this invention, a test substrate 10 in prepared. The test substrate 10 is comprised of a support 11 on which there is formed first metal layer 12 of a colored metal and second metal layer 13 of a silvery white metal.

The support 11 is made from a heat resistant, transparent to translucent material capable of being subjected to the relatively high temperature of the molten solder bath. Borosilicate glass is satisfactory for the support as this glass has the required high temperature properties and is relatively inexpensive.

The size of the support is not critical and is selected to be of a convenient size to conduct the test. Supports about 8 mm in length, 6 mm in width and about 0.2 mm in thickness have been found to be well suited for the test substrates.

The surface 14 which is to be metallized, can be given a surface pretreatment to improve the adhesion of the first layer 12 to the surface 14 of the support 11. For example, if gold is to be used as the first layer 12, thin transparent layer of chromium is advantageously applied to the surface 14 of the support 11. A layer of chromium about 50 angstroms in thickness has been found to be sufficient to improve the adhesion of the gold but is of an insufficient thickness to impart its color to or to hide the color of the first metallic layer 12.

Once the support has been prepared, the first colored metal layer 12 is applied to the surface 14 of support 11. The metal of the first layer can be applied by various techniques such as by evaporation. The metal which is used for the first layer 12 must have a color which is easily distinguished optically from the color of the molten solder bath which is to be evaluated. The preferred metal for most evaluations is copper with gold being a generally satisfactorily substitute except for its cost. The first layer 14 of the colored metal is formed in as thin a layer as possible but one which will show its distinct color when viewed through the support 11 from the unmetallized side 15. Generally, a layer about 1000 angstroms in thickness is adequate for this purpose.

The second layer 13 is applied over the first layer 12. The second layer 13 is formed of the silvery white metal, the presence of which and/or the amount of which, is desired to be evaluated in the solder composition. The second metal layer 13 is likewise deposited by any convenient means, preferably by evaporation, in a substantially thicker layer than the first layer 12. The second metal layer 13 must be sufficiently thick so that it will take a reasonably long time for the layer to be removed during the test. This is required in order to produce accurate differential times to determine the amount of the metal impurities in the solder. It is important that a known consistent thickness of the layer 13 be deposited in order to have uniformity of the test results. It has been found in practice that a second layer 13 about 3 micrometers ($\mu$m) in thickness is satisfactory for the purposes of this test.

Once test substrates 10 are prepared the evaluation of the molten solder compositions can be conducted. The solder bath is maintained at a known temperature, preferably the temperature at which the solder will be used. For a 60 percent tin/40 percent lead solder alloy composition, the temperature is about 260° C.

The method of practicing the present invention is schematically shown in FIG. 3. The test substrate 10 is placed in contact with the molden solder bath 16. The first layer 12 and the second layer 13 are immersed into the molten solder bath while the unmetallized surface 15 of the test substrate is left exposed so the color of the first layer 12 can be observed through the substrate 10. The time when the substrate 10 is placed in contact with the molten solder bath is noted as the starting time of the test. The end point of the test is when the inner metal layer changes color as observed through the substrate from the surface 15.

The test can be conducted on a molten solder bath in a static state or can be conducted on a flowing molten solder bath such as that encountered in a wave soldering machine. The results obtained are calibrated according to the method of conducting the test. The change in color of the first layer 12 will generally occur faster when the molten solder is in motion.

The amount of the given metal in a solder composition is determined by measuring the time required for alloying and the change of color of the first layer 12 as observed through the support 11 from the surface 15 and evaluating the results against a calibration chart. The chart is developed by evaluating solders having the desired metal alloy composition and solders having known amounts of the given metallic contaminate.

Figure 4:
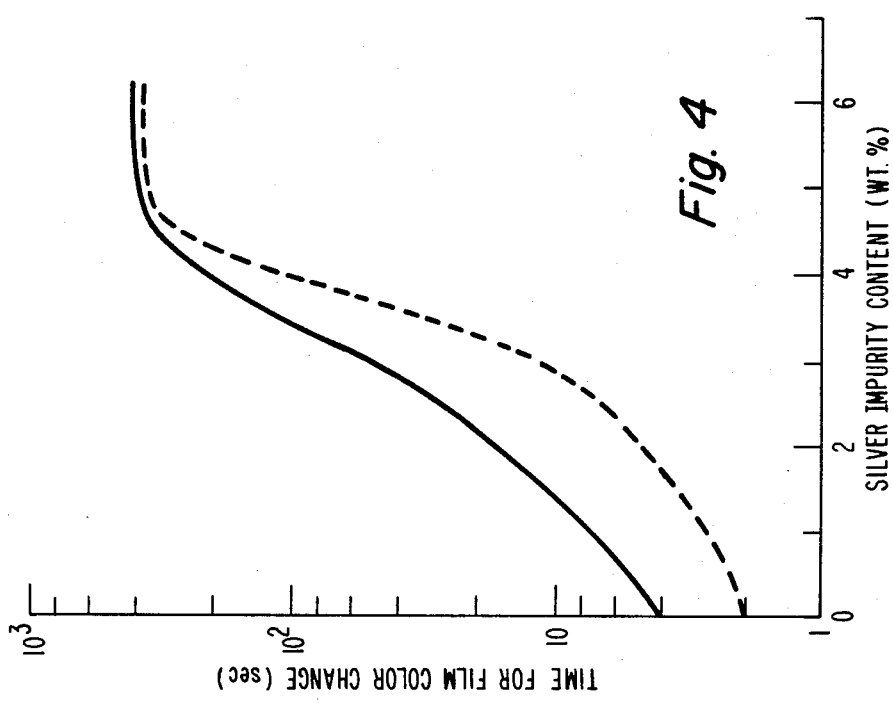
FIG. 4 is a graphic ilustration showing the relationship of the time required for a color change to occur and the amount of silver present as an impurity in a sixty percent tin/forty percent lead solder composition.

In FIG. 4 there is shown the results obtained with silver present as an impurity in a 60 percent tin/40 percent lead solder alloy composition under both static conditions, as indicated by the dotted line, and under flowing solder test conditions, as shown by the solid line. The flow rates during the dynamic test are maintained at approximately 14 centimeters flow rate per second past the test substrate. In FIG. 5 there is shown the rate of dissolution of silver from the second layer 13 as a function of the amount of silver contamination in the solder alloy composition.

Figure 7:
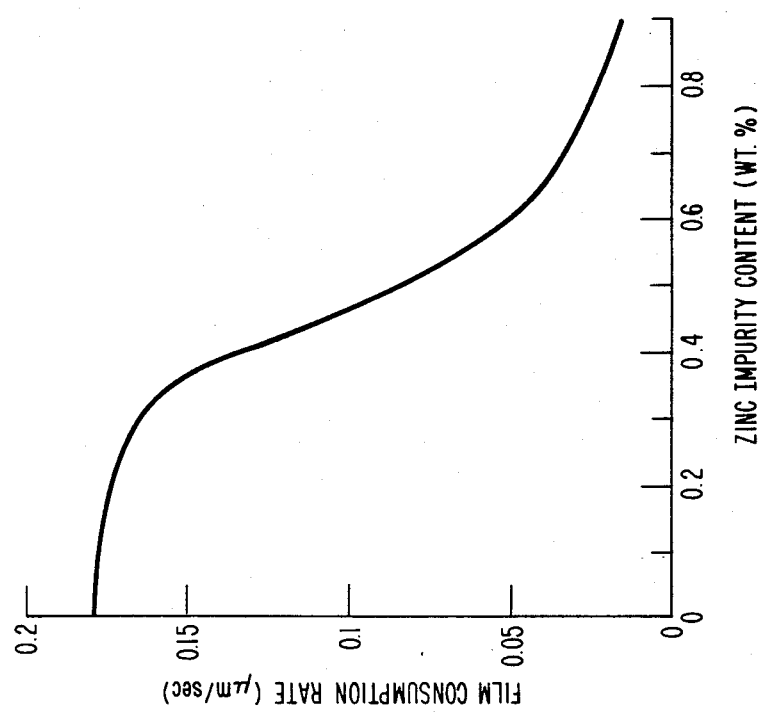
FIG. 7 is a graphic illustration showing the rate of consumption of a silver film as related to the level of zinc present as an impurity in a sixty percent tin/forty percent lead solder composition.
Figure 6:
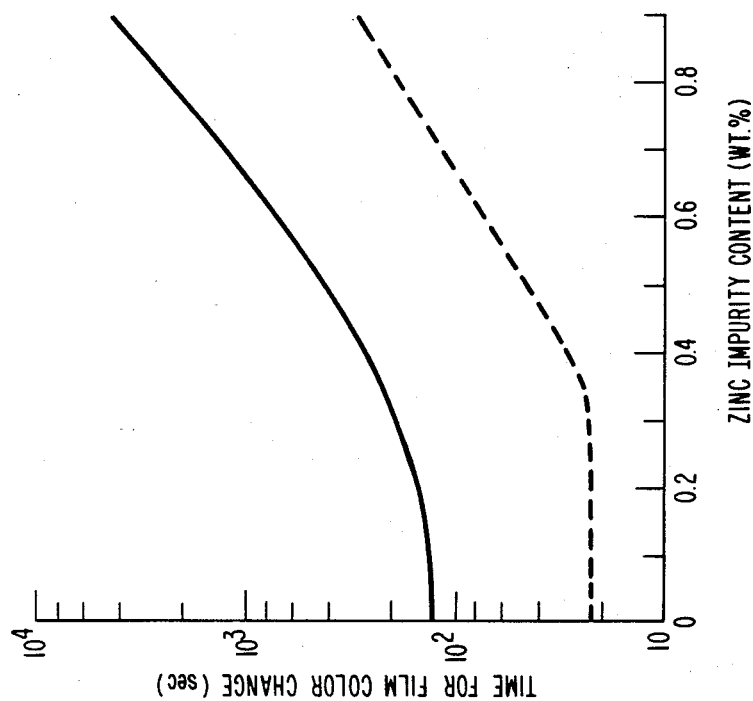
FIG. 6 is a graphic illustration showing the relationship of the time required for a color change to occur and the amount of zinc present as an impurity in a sixty percent tin/forty percent lead solder composition.

Substantially similar results are shown in FIGS. 6 and 7 for a nominal 60 percent tin and 40 percent lead solder alloy contaminated with zinc.

Once charts such as those shown in FIGS. 4 to 7 have been developed for a particular solder alloy composition, an accurate determination of the level of impurities can be made by reference to the chart and the time required for the color change to occur.

It has been found by comparing the results obtained by the present method to the analytical data obtained by the prior art conventional methods that there is an extremely close correlation of results despite the relative simplicity of the present method compared to the prior art methods.

The present method can be used as both a production control method and as an analytical tool. In commercial production it is expected that a certain amount of impurities will inherently be introduced into the solder during mass soldering and accordingly, specifications are established for the maximum permissable amounts of each metal impurity. By using the above-described method of this invention, the level of each of these impurities can be monitored and adjustments made by the addition of the required amount of metals comprising the solder composition to keep the solder alloy within specification.

The method of this invention can likewise be used as an analytical tool to determine and identify the amount of unknown contaminates in a solder bath by using a series of test substrates, each having a different type of silvery white metal on the substrate to determine which metal or metals are present as impurities in the solder.

The following examples are given by further illustration of the present invention. The examples, however, are not intended to limit the scope or content of this invention beyond that of the subjoined claims. All parts and percentages are parts and percentages by weight unless otherwise indicated.

EXAMPLE 1

A series of test substrates were prepared using borosilicate glass as the support. The size of the supports were 8 mm in length, 6 mm in width, and about 0.2 mm (0.17–0.25 mm) in thickness. About a 50 angstrom thick layer of chromium was applied and then a layer about 1000 angstroms in thickness of gold were evaporated onto the glass supports. The chromium layer was so thin as to be transparent and the observation of the color of the gold inner layer was not impeded. Over the gold layer, a 3 μm thick silver outer layer was evaporated. All of the evaporation processes were carried out using a mask, and the result metallized area was 4 mm square.

A solder composition was made from 60 percent of virgin tin and 40 percent of virgin lead.

The solder composition was then divided in a number of separate batches. One batch was left uncontaminated. The remainder of the batches were contaminated with various amounts of metallic silver. Samples were prepared with 0.5, 1, 2, 2.5, 3, 4, 5 and 6 percent of silver.

Each batch of solder was heated to 260° C. A separate test substrate prepared as above was used to evaluate each batch.

The test substrates were placed on each molten solder batch with the surface of the outer silver layer in contact with the solder. The time required for a change in the color of the inner gold layer observed through the glass substrate was determined. Measurements of the time for the color change were carried out at 260° C. under stationary and flowing (14.7 cm/sec.) conditions.

The times for the color changes which were obtained are plotted in FIG. 4 as a function of the silver impurity content in each solder batch. FIG. 4 shows that the time for the change increases with increasing impurity content. It can also be seen that the slope of the plots for both stationary and flowing solder decreases from a steep one to a gentle one when the impurity content exceeds about 4.5%. This suggests that the normal 60 percent tin and 40 percent lead solder is saturated with the silver as an impurity at contents higher than 4.5% at 260° C., and under this condition the silver layer does not dissolve into the molten solder.

EXAMPLE 2

Example 1 was repeated with the exception that the chromium treatment of the support was omitted and copper was used as the first metal layer. The results obtained with the copper layer were substantially identical, within experimental error, with the results obtained with the gold layer.

EXAMPLE 3

The preparation of test substrates described in Example 1 was repeated with the exception that the chromium treatment of the support was omitted and copper was used on the first layer.

Solder samples were prepared as in Example 1 except using zinc in place of silver as a contaminate in a 60 percent tin and 40 percent lead solder alloy. The test was repeated as therein described and the results are reported in FIGS. 6 and 7.

What is claimed is:

1. A method for testing a silvery white solder for the presence of silvery white metal contaminates which comprises:
   (a) providing a transparent to translucent substrate coated with a first thin layer of a colored metal which can form an alloy with said solder, and a second outer layer of the metal to be tested,
   (b) partially immersing the coated substrate in the molten solder to be tested, and
   (c) measure the time required for a change in color of the first layer and compare the measure of time with a known standard.

2. The method according the claim 1 wherein the first layer is formed of copper.

3. The method according to claim 1 wherein the first layer is formed of gold.

4. The method according to claim 1 wherein the first layer is about 1000 angstroms in thickness.

5. The method according to claim 1 wherein the second layer is about 3 micrometers in thickness.

6. The method according to claim 1 wherein the test substrate is placed in a static solder bath.

7. The method according to claim 1 wherein the molten solder alloy is agitated while in contact with the test substrate.

8. The test substrate for use in the method of claim 1 wherein said substrate is comprised of a transparent to translucent support having formed on a surface thereof a first layer of a colored metal that will alloy with a molten solder alloy; and a second layer of said silver white metal to be tested on said first layer and having a substantially greater thickness than said first layer such that when brought into contact with the molten solder bath a rate of dissolution of the entire thickness of the second layer can be established over a readily measured length of time.

* * * * *